United States Patent [19]
Seckinger

[11] 3,907,125
[45] Sept. 23, 1975

[54] APPARATUS FOR THE DELIVERY AND REMOVAL OF PALETTES PROVIDED WITH WORK-PIECES ON MACHINE TOOLS

[75] Inventor: Ernst Seckinger, Zurich, Switzerland

[73] Assignee: Reishauer AG., Switzerland

[22] Filed: Sept. 11, 1974

[21] Appl. No.: 505,058

[30] Foreign Application Priority Data
Sept. 17, 1973 Switzerland.................... 13304/73

[52] U.S. Cl.................. 214/1 B; 198/19; 198/20 R
[51] Int. Cl.²....................................... B65G 47/00
[58] Field of Search...... 214/1 B, 1 BC, 1 BH, 1 BS, 214/301; 198/19, 20 R

[56] References Cited
UNITED STATES PATENTS

| | | |
|---|---|---|
| 3,127,025 | 3/1964 | Clark et al......................... 198/20 X |
| 3,315,778 | 4/1967 | Kendall, Sr. et al................... 198/19 |
| 3,456,813 | 7/1969 | Grainger et al..................... 214/1 Q |
| 3,578,412 | 5/1971 | Martin............................. 198/19 X |
| 3,805,944 | 4/1974 | Yuryan........................... 198/20 R |

Primary Examiner—Frank E. Werner
Attorney, Agent, or Firm—Hill, Gross, Simpson, Van Santen, Steadman, Chiara & Simpson

[57] ABSTRACT

The invention relates to an apparatus for the delivery and removal of palettes provided with screw-tap or internal thread form blanks on machine tools for the processing of these work-pieces, as for example on groove milling machines, shaft grinding machines, thread grinding machines or thread relief grinding machines, tap drilling relief grinding machines, and groove grinding machines, etc.

10 Claims, 13 Drawing Figures

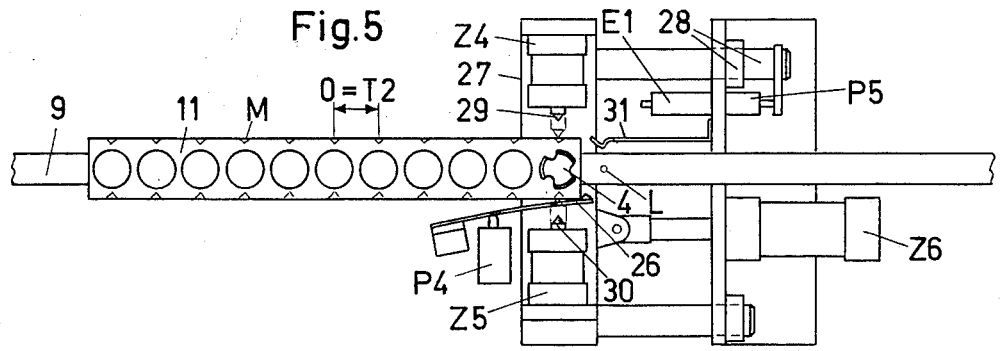
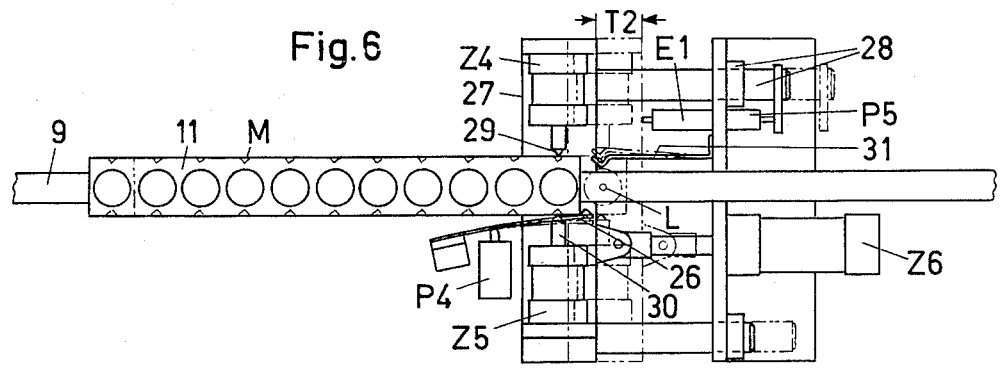
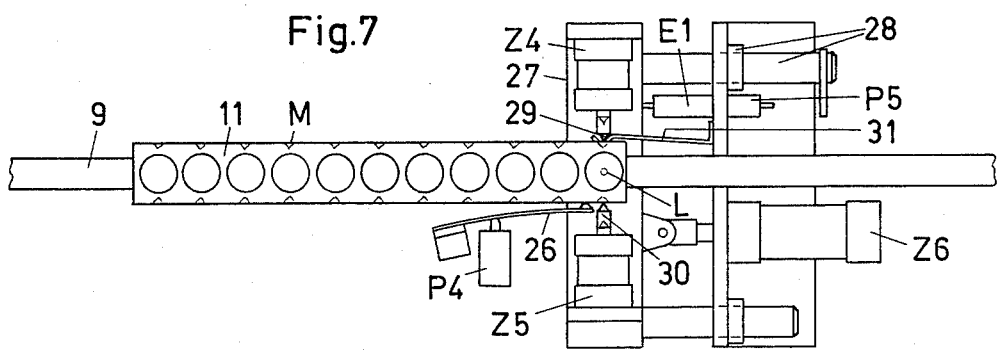
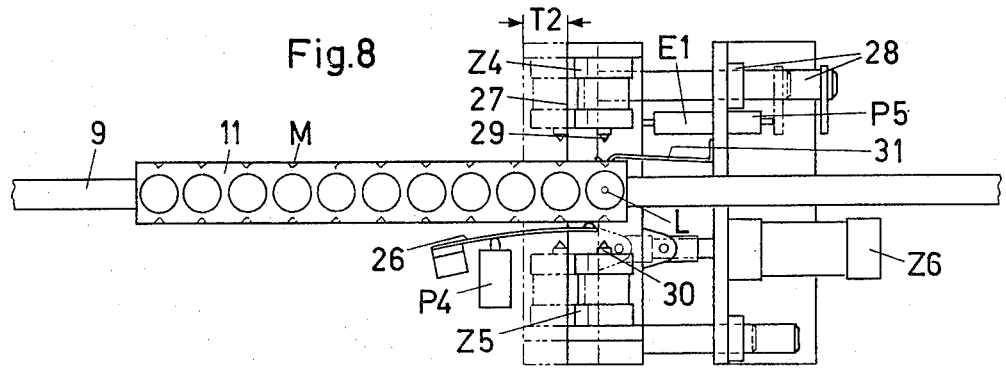

APPARATUS FOR THE DELIVERY AND REMOVAL OF PALETTES PROVIDED WITH WORK-PIECES ON MACHINE TOOLS

This invention relates to apparatus for the delivery and removal of palettes containing work-pieces to machine tools which work-pieces are to ge processed on the machine tool.

Some known devices for the feed of tapping and internal thread forming blanks on tap processing machines operate with stacking magazines, in which the work-pieces are inserted manually. The insertion, dependent upon the geometrical shape of the work-pieces which, as a rule, have a thick, short cutting part and a long, thin shaft, may take place solely with the aid of separators or protective layers which must be inserted between the shafts of the work-pieces.

The automatic return of the processed work-pieces to the mentioned stacking magazine, for the purpose of passing on to the next processing machine, is not possible on account of the above mentioned separators. The work-pieces are released after their processing by means of withdrawing the centering tips of the processing machine and then drop, for example, into a container where they form a disorderly heap. This type of work-piece release may, especially after the thread grinding result in damage to the finished products. The taps or internal thread forms processed in this manner must be replaced into the stacking magazine when a more or less automated further processing of the work-pieces is required on another machine tool.

SUMMARY OF THE INVENTION

A principal object of this invention, therefore, is to provide a means for feeding work-pieces to a machine tool whereby the above mentioned disadvantages may be overcome.

A further object is to provide a feed system for work-piece carrying palettes wherein the palettes are arranged in a uniformly spaced array on a feed member which may be advanced in predetermined steps.

Another object is to provide in connection with the palette feed system automatically actuatable means for receiving a palette from the feed member and passing it on to a loading and unloading device and then return it to the feed member.

A further object is to provide feed means which may be utilized for different types of processing of work-pieces on different processing machines without any type of change-over of the work-pieces.

Another object is to provide means whereby the work-pieces may be handled without damage during their processing and their transportation from one process point to the other.

By way of summary, the invention provides that the palettes containing the several work-pieces are arranged parallel to one another at uniform spacing on a feed member which advances step by step, and are guided on the same slidably in their longitudinal direction, and that automatically actuatable means are provided for the reception of the individual palettes from the feed member, for the continuation of the same to the loading and unloading device of the machine tool and for the return to the feed member.

Other objects and advantages of this invention will become more readily apparent when considered in connection with the description and the accompanying drawings.

BRIEF DESCRIPTION OF THE DRAWINGS

FIGS. 5 to 8 show four different positions of the device embodying the invention for the gradual or step by step delivery of the palette to the loading and unloading station, respectively, of the work-piece loading device;

Figure 1:
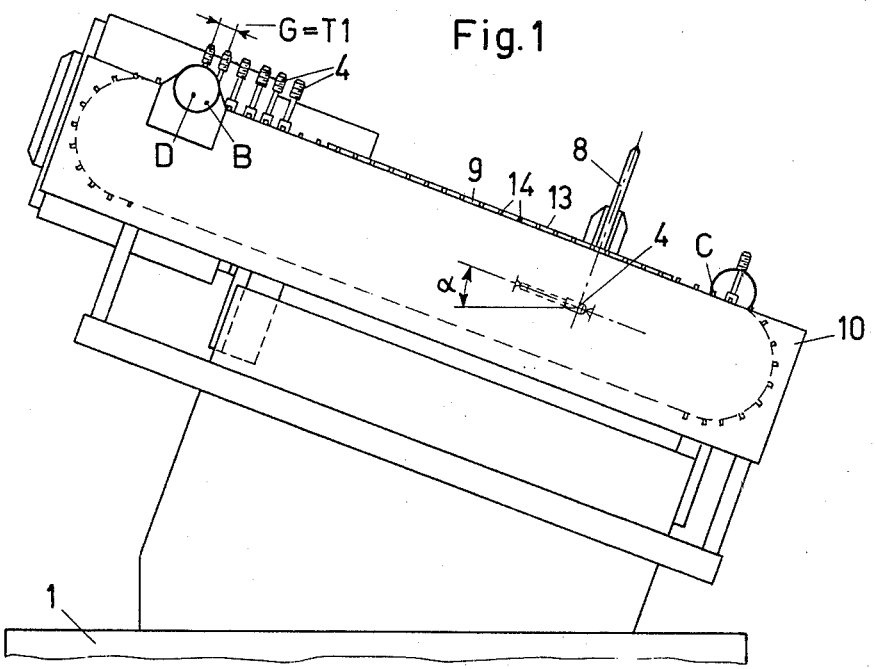
FIG. 1 shows a diagrammatic view in elevation of a thread grinding machine together with a device for the delivery and removal of palettes provided with work-pieces.
Figure 2:
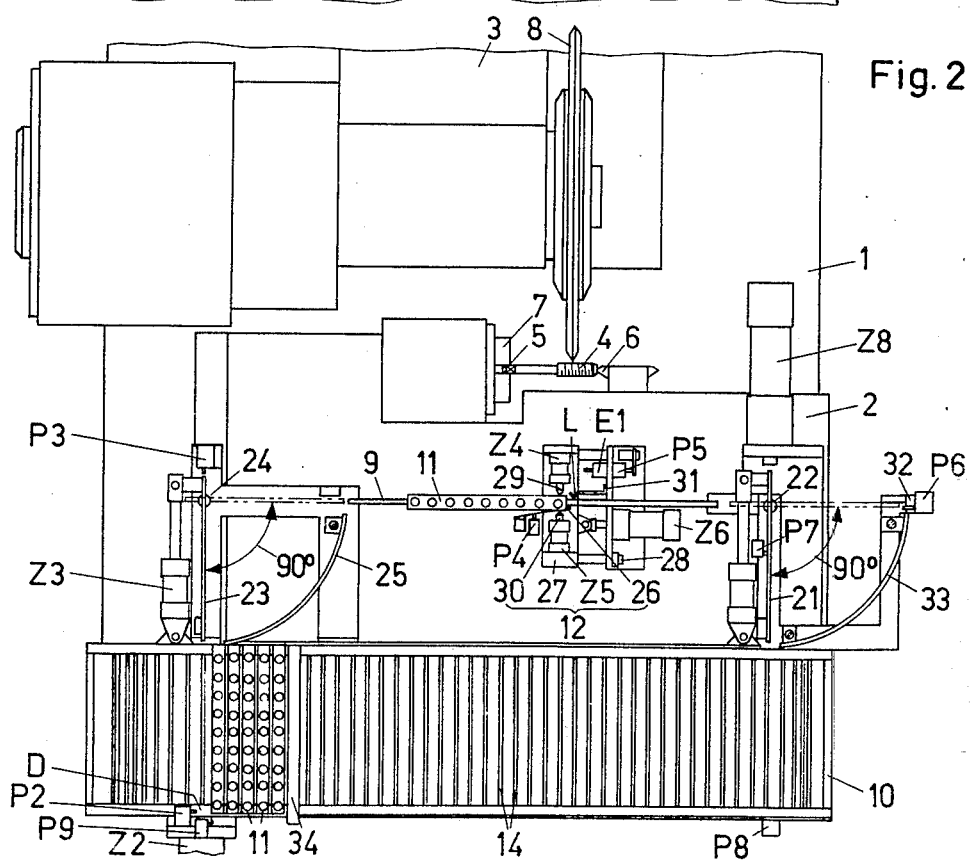
FIG. 2 shows a plan view of the thread grinding machine and device shown in FIG. 1.
Figure 3:
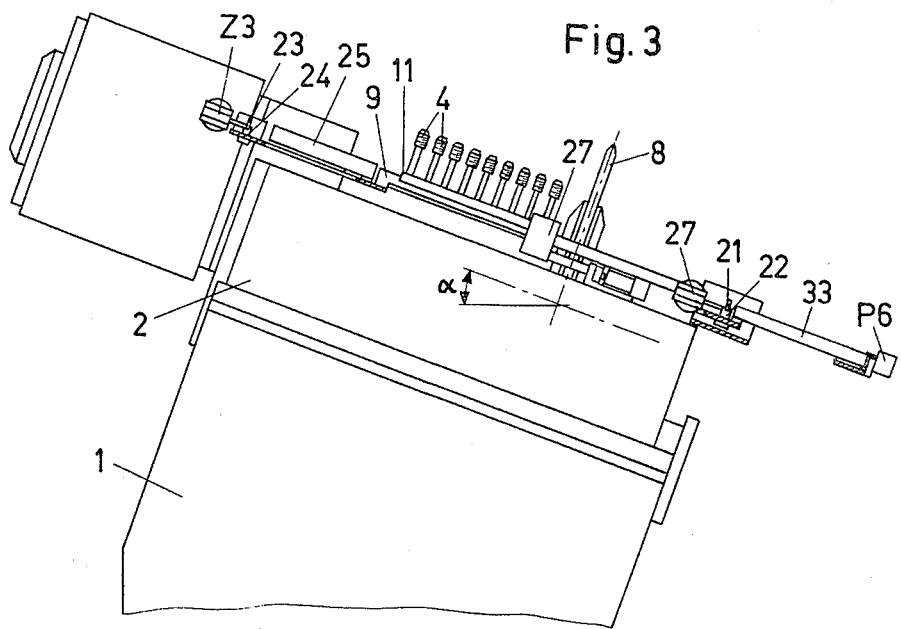
FIG. 3 shows a view of the thread grinding machine illustrated in FIG. 1, however, for the purpose of rendering visible the inclined work-piece slide and grinding slide, as well as the inclined guide rail, while omitting the chain magazine.

The third grinding machine shown in FIGS. 1, 2 and 3 has a frame 1 which serves as support for the slidable receipt of the work-piece slide or carriage 2 and the grinding slide or carriage 3. The work-piece 4 is as usual clamped between the centering tips 5 and 6 (FIG. 2) and is set into a rotary movement by an actuator device 7. The drives and the sliding devices of the work-piece carriage 2 and of the grinding carriage 3, the drive of the grinding disc 8 as well as other elements of the thread grinding machine having no effect on the device of the invention, are generally known and, therefore, not specifically described.

In the embodiment shown by way of example the work-piece carriage 2 with the clamped work-piece 4 and the grinding carriage 3 are inclined at a predetermined angle $\alpha$ to the right as shown in FIG. 3.

The device shown embodying the invention for the delivery and removal of the work-pieces disposed in palettes comprises a chain magazine or housing 10, a conveyor chain mechanism 13 and a plurality of palettes 11 disposed on the conveyor chain mechanism 13 as well as means for transfering the individual palettes to a guide rail 9. The guide rail 9 is inclined at the same angle $\alpha$ mentioned above to the horizontal. From this guide rail 9 the palettes 11 under the influence of gravity acting on the same, move to a so-called cycling device 12, which conveys them gradually or step by step through the loading and unloading station respectively, of the work-piece loading device (not shown). This loading device may be constructed in a manner known per se and it is, therefore, not described in greater detail.

Figures 9, 9A, 10, 10A:
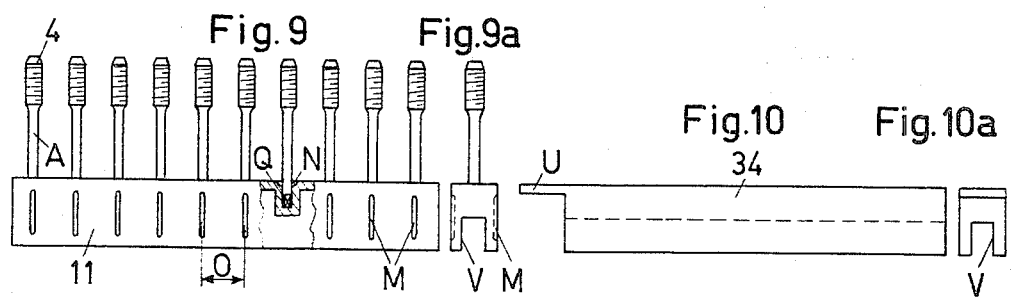
FIGS. 9, 9a are illustrations of a palette in side and front view, provided with threaded blanks to be processed.
FIGS. 10, 10a are side and front views of a blank palette for the automatic disconnection of the device after complete passage of all palettes.

In the following the individual constituents of the device shown are described and subsequently their functions are explained:

The work-pieces 4 to be processed are inserted in palettes 11 in such manner, that the shaft A of each work-piece enters into a correspondingly shaped hole N of the palette (FIG. 9). For individual processing steps, such as relief grinding of the thread and the notching, grinding of the grooves, etc., the work-pieces 4 to be processed are clamped in the processing machine in a predetermined position, for example, with reference to the grooves of thread bores or the rolling edges of internal thread formers. For this reason, the work-pieces 4 must be arranged in an exactly oriented position in the palettes 11. In most cases the work-pieces 4 have a shaft A provided with a square end Q. On the square end Q, one of the four surfaces which has an exactly defined position with respect to the grooves or rolling edges, respectively, serves as reference surface for the processing steps mentioned at the beginning and for the disposition of the work-pieces 4 in the palettes 11. The surface serving as reference surface for purposes of recognition is provided with a reference point.

Figure 4:
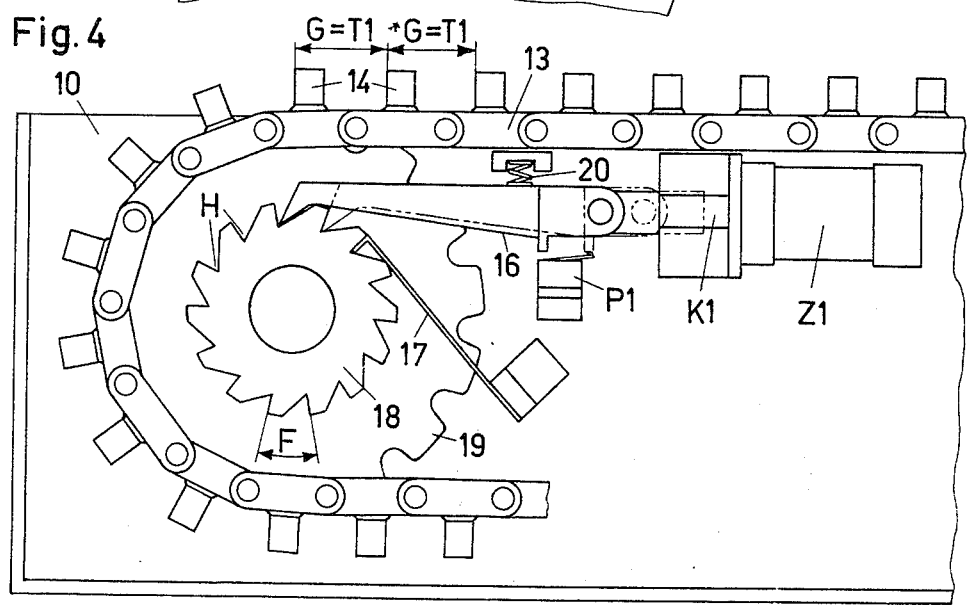
FIG. 4 is a view in elevation showing in part the chain conveyor device.

In the disclosed embodiment magazine 10 is disposed a feed member which comprises a continuous conveyor chain mechanism 13 including a pair of chains which extend parallel to one another over pairs of sprocket wheels 19. Of the latter there is shown in FIG. 4 the front sprocket wheel 19 of the one pair of chain wheels. The individual chains 13 are interconnected by means of rails 14. Each of the rails are of rectangular cross-section and serve as a supporting guide rail for each of the palettes 11. These rails 14 are adapted to have a palette 11 seated thereon. As is apparent from FIG. 9a the palettes 11 are formed on their lower side with rectangular recesses V which correspond to the shape of the rails 14, so that the palettes 11 are slidable in their longitudinal direction on the rails. As the work-pieces 4 are inserted only loosely with their shaft A in the palette 11 (FIG. 9), only the upper portion of the chain 13 from the point B to the point C (FIG. 1) may be used as support for the palettes.

The chain magazine 10 is inclined at the same angle $\alpha$ to the horizontal, as work-piece carriage 2.

Figure 11:
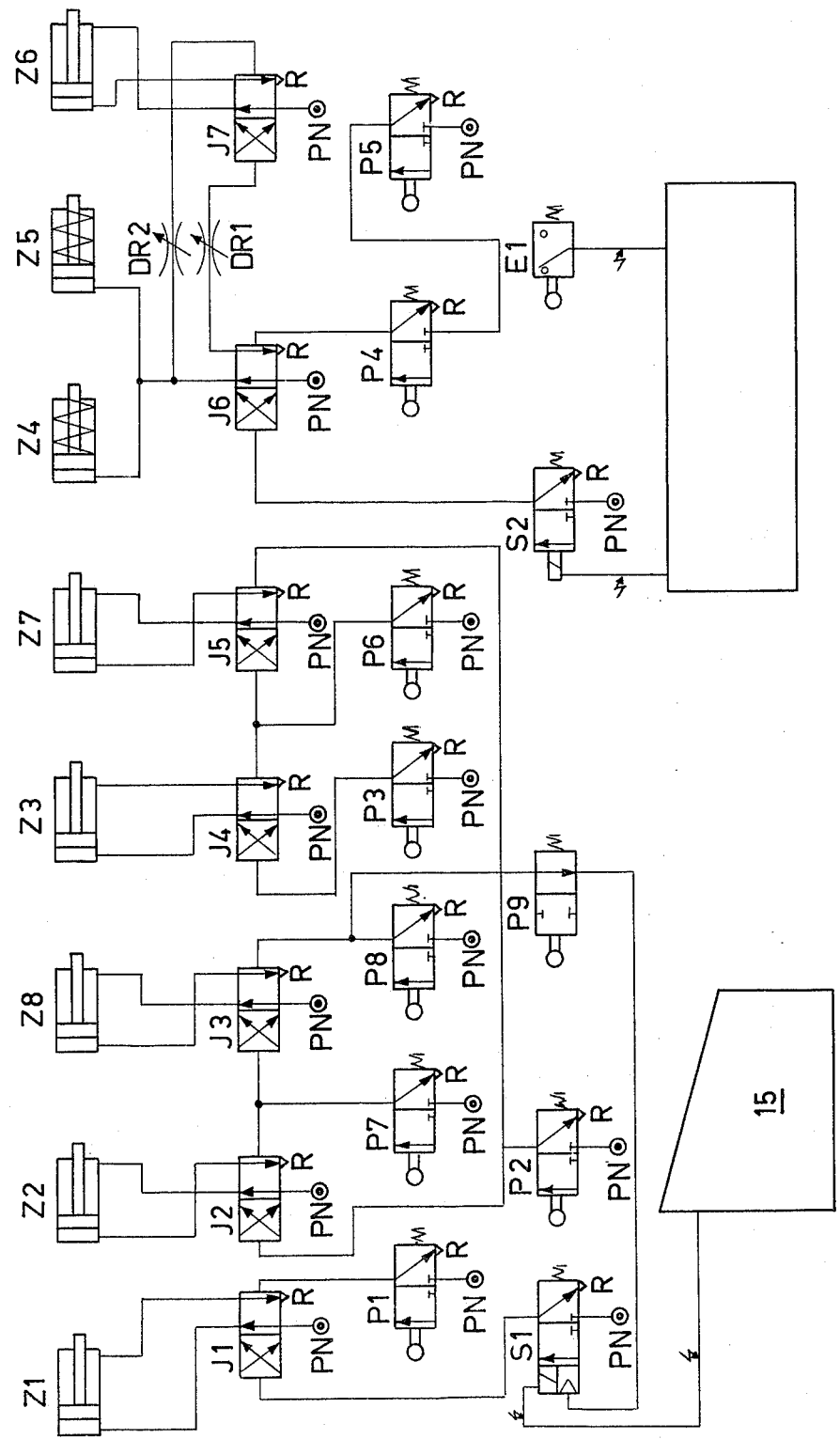
FIG. 11 is a control diagram fro the compressed air actuated drive of the device for the delivery and removal of the work-piece palettes.

The drive of the conveyor chain 13 takes place by means of compressed air in the embodiment shown by way of example. The drive is started by means of a starting key (not shown) on the control panel 15 (FIG. 11).

The chain drive is driven by means of a pneumatic cylinder or linear actuator $Z_1$ (FIGS. 4, 11), whose piston $K_1$ is shifted to the right upon actuation of the magnet valve $S_1$ with a pneumatic servo valve and which in turn actuates pneumatic slide valve $J_1$. The piston $k_1$ acts on the valve $P_1$ when it reaches its extreme right hand position (FIG. 4). The valve $P_1$ returns the pneumatic slide valve $J_1$, whereby the piston $K_1$ of the cylinder $Z_1$ is again pushed into its extreme left hand position (FIG. 4). A pawl 16 which engages the index wheel 18 is pivotally attached to the piston $K_1$. A leaf spring 17 having a detent means engages and restrains the index wheel 18 against rotation generally. The index wheel is connected to one of the chain sprockets 19 which drive the chain 13. When the piston $K_1$ moves to the right (FIG. 4) the pawl 16 is retracted with the piston $K_1$. When the piston $K_1$ moves from right to left, that is returns to its normal position, the pawl 17 actuates the index wheel 18 moving it one tooth division F. The chain 13 is then moved by one step $T_1$ of the cycle which corresponds with the spacing G of the rails 14 on the chains 13. The spring detent 17 after movement of the index wheel 18 engages the next tooth gap H. A compression spring 20 biases the pawl 16 into engagement with the tooth gaps H of the index wheel 18.

From the chain magazine 10, the palettes 11 must be guided individually to a guide rail 9. The guide rail 9 is fixed on the housing of the chain magazine 10 so that it runs parallel to the same and likewise is inclined at an angle $\alpha$ to the horizontal. Work-piece carriage 2, chain magazine 10 and guide rail 9 are, therefore, parallel to one another. The purpose of the guide rail 9 is to guide the individual palettes 11 to the cycle device 12. The purpose of the cycle device is to guide the palettes in stages through the loading and unloading station L, respectively, to the work-piece loading device (not shown). For transferring of the palettes 11 from the chain magazine 10 to the guide rail 9, a swingable carrier in the form of an arm 23 (FIG. 2) is provided. The arm 23 is swingable about the axis 24 for 90° and is actuated by means of a pneumatic cylinder $Z_3$. The starting position in which the arm 23 is aligned with a palette 11 is shown in full lines in FIG. 2. The rotated position in which the arm 23 is aligned with the guide rail 9 is shown in dash-dotted lines. After a palette 11, is pushed in its longitudinal direction from the rail 14 to the arm 23 aligned therewith, then the arm 23 is swung by the cylinder $Z_3$ through an arc of 90° during which an arcuately-shaped protective metal member 25 prevents the palette from sliding from the arm 23. When the arm 23 is aligned with the guide rail 9, the palette 11 then slides as a result of the inclination of the guide rail 9 under the effect of gravity from the left raised position to the right lower position (FIGS. 1 to 3) until it encounters a resilient stop member 26 (FIGS. 2 and 5 to 8).

The cycle device 12 has a carriage 27 which by means of the pneumatic cylinder $Z_6$ may be moved back and forth parallel to the guide rail 9 by a cycle step $T_2$ (FIGS. 5 to 8). Two grippers 29 and 30 arranged on the carriage 27 are provided which may be closed or opened by pneumatic cylinders $Z_4$ or $Z_5$, respectively. Upon closure of the grippers 29 and 30 the latter enter into the grooves M arranged on both sides of the palette 11, said grooves M being aligned on the axes of the receiving holes N for the work-pieces 4 (FIGS. 5 and 9). The spacing O of the grooves M or the receiving holes N, respectively, corresponds with the cycle step $T_2$ of the cycle device 12. The carriage 27 normally is located in the position of rest as shown in FIGS. 2 and 5, for example, that is, there where the grippers 29 and 30 may enter first into the oppositely disposed grooves M of the palette 11 disposed in the starting position.

The passage of a palette 11 through the cycle device 12 is shown in FIGS. 5 to 8. In FIG. 5 the palette abuts on the resilient stop member 26. It is in the starting position for the cycle, that is for the gradual or step by step passage of the palette. The grippers 29, 30 which were disposed in the open position shown in full lines are closed (dash-dotted position in FIG. 5). They are disposed in their upper extreme left hand position (see FIGS. 2 and 5 to 8). FIG. 6 shows the second step sequence: The grippers 29, 30 are shifted to the right as shown in the dash-dotted position in FIGS. 2 and 5 to 8. The palette 11 is actuated by one step of the cycle downwardly to the right and its first receiving hole N is disposed in the loading and unloading station L, respectively, of the work-piece loading device, (not shown). FIG. 7 shows the third step sequence: The grippers 29, 30 are disposed in their lower extreme right hand position (see FIGS. 2 and 5 to 8). The grippers 29, 30 are open (dash-dotted position shown). FIG. 8 finally shows the fourth step sequence: The grippers 29, 30 slide to the extreme left hand position shown in dash-dotted lines in FIGS. 2 and 5 to 8, where the grippers remain in the open position.

After an entire palette has been passed step by step through the loading and unloading station L, it slides downwardly on the guide rail 9 again under the influence of gravity, that is, to the right in FIGS. 5 to 8. It slides onto a lower pivotable arm 21 which is swingable about the axis 22 and at this point of time is aligned on the guide rail 9. Through the pneumatic cylinder $Z_7$, the arm 21 may then be swung clockwise by 90° from the dash-dotted position shown in FIG. 2 into the position shown in drawn-out lines. An arcuately shaped pneumatic sheet metal barrier 33 prevents the palette 11 from sliding off the arm 21. As soon as the arm 21 is aligned with a rail 14, the palette 11 is pushed onto this rail 14. At this point one operative step is concluded.

The described device functions as follows:

After palettes loaded with work-pieces 4 to be processed have been placed on the conveyor chain 13, the drive of the conveyor chain 13 is started in the above described manner. The conveyor is advanced by one step $T_1$ of the cycle, which corresponds to the spacing G of the rails 14 on the chain 13. By means of this first step $T_1$ of the cycle the first palette 11 reaches the station located at point D (FIGS. 1, 2 and 11) at which point the palette is removed from the conveyor chain. Upon reaching this point D, the mentioned palette 11 contacts and actuates a valve $P_2$ which at the same time actuates pneumatic slide valves $J_2$, $J_5$ (FIG. 11). The actuation of the pneumatic slide valve $J_2$ causes an actuation of the cylinder $Z_2$ (FIG. 2) which causes the palette 11 to be moved from its corresponding rail 14 onto the upper swivel arm 23 with which the rail 14 has been aligned. The simultaneously actuated penumatic slide valve $J_5$ brings about an actuation of the cylinder $Z_7$ (FIG. 2), by means of which a lower swivel arm 21 which is positioned on a rotary axle 22 and is connected through said axle 22 with the housing of the chain magazine 10, is swung by 90°, so that it is aligned with the guide rail 9.

On the upper swivel arm 23 which is positioned on the rotating axle 24 and is connected through it with the housing of the chain magazine 10, the palette 11 mentioned above comes in contact with the valve $P_3$ and actuates it. The mentioned valve $P_3$, on its part, actuates the pneumatic slide valve $J_4$ which causes an actuation of the cylinder $Z_3$. The cylinder $Z_3$ brings about a swiveling of the upper swivel arm 23 by rotating at 90°, so that is is aligned with the guide rail 9. After conclusion of the swinging movement of the upper swivel arm 23 in the direction of the guide rail 9, the palette 11 automatically slides downward as far as the resilient stop member 26. The latter is arranged on the loading and unloading station L of the work-piece loading device, (not shown) in such manner that the palette 11 is disposed in that starting position (FIG. 2, 5) from where it is taken over by the cycle device 12, for the purpose of cycling-on through the loading and unloading station L of the work-piece loading device.

When the palette 11 encounters the resilient stop member 26, the latter yields and moves somewhat and thereby actuates the valve $P_4$. The valve $P_5$ through which the valve $P_4$ is supplied, is already actuated by means of the upper end position of the carriage 27, that is, the feed of the pressure medium into the valve $P_4$ is insured. The valve $P_4$ brings about, on the one hand, an actuation of the pneumatic slide valve $J_6$ and, on the other hand, an actuation of the pneumatic slide valve $J_7$ delayed by the throttle $DR_2$. The actuation of the pneumatic slide valve $J_6$ brings about an immediate actuation of the pneumatic cylinders $Z_4$ and $Z_5$ to close the grippers 29 and 30 associated with them, which grasps the palettes 11 in the grooves M (FIG. 5). Now the actuation delayed by the throttle $DR_2$ of the pneumatic slide valve $J_7$ enters into operation. The latter now brings about an actuation of the pneumatic cylinder $Z_6$, which slides the carriage 27 with the grippers 29 and 30 and the palettes 11 held therewith into the lower position shown by dot-dash lines (FIG. 6) that is, by one step $T_2$ of the cycle downwardly.

In the lower end position of the carriage 27 now the first receiving hole N (FIG. 9) of the palette 11 is located exactly on the loading and unloading station L of the work-piece loading device, not shown. For insuring this assumed position of the palette 11 during the accomplishment of the following step $T_2$ of the cycle, during which the grippers 29 and 30 are opened (FIG. 7) and again pushed to the left and upwardly with the carriage 27 (FIG. 8), a spring 31 (see FIG. 8) operates to engage the groove M of the palette 11 disposed exactly in the loading and unloading station L of the work-piece loading device.

When the carriage 27 reaches the lower end position, an electric switch $E_1$ is actuated thereby (FIG. 6) which starts the work-piece loading device, not shown. After the complete loading and unloading movement of the work-piece loading device has been accomplished, an electrical impulse takes place from the same which actuates the magnet valve $S_2$. The energized magnet valve $S_2$ brings about an actuation of the pnuematic slide valve $J_6$ and an actuation delayed by the throttle valve $DR_1$ of the pneumatic slide valve $J_7$. The actuation of the pneumatic slide valve $J_6$ causes an immediate actuation of the pneumatic cylinders $Z_4$ and $Z_5$, respectively, and an immediate opening of the grippers 29 and 30 connected with the latter (FIG. 7). After complete opening of the mentioned grippers 29 and 30, the above mentioned delayed actuation of the pneumatic slide valve $J_7$ takes place, which, then actuates the pneumatic cylinder $Z_6$ to slide the carriage 27 again into its upper end position, respectively (FIG. 8). Upon reaching the upper end position the carriage 27 actuates the valve $P_5$. As long as the palette 11 is maintained in contact with the resilient stop member 26, that is, the resilient stop member 26 is bent back and the valve $P_4$ is continuously actuated, due to the actuation of the valve $P_5$, the cycle for the continued movement of the palette 11 through the loading and unloading station L of the work-piece loading device is repeated. This cycle is repeated for as long as necessary until the entire palette 11 has been moved through the work station. After the entire palette 11 has been moved through the work station the valve $P_4$ returns to its starting position. After the processing of all work-pieces 4 of a palette 11, the palette slides downwardly on the inclined guide rail 9 and onto the lower swivel arm 21 positioned in alignment with guide rail 9 at this time. The movement of palette 11 is impeded by the stop member 32. The palette 11 thereupon actuates the valve $P_6$ disposed on the stop member 32, which, in turn, actuates the slide valves $J_4$ and $J_5$. The actuation of the slide valve $J_5$ brings about an actuation of the pneumatic cylinder $Z_7$, through which the lower swivel arm 21 is swung 90° in such manner that it now is in alignment with a rail 14 of the chain magazine 10. The slide valve $J_4$ actuated simultaneously brings about an actuation of the pneumatic cylinder $Z_3$ which swings the upper swivel arm 23 90°, so that it is in alignment with a corresponding rail 14 at this time, that is, the swivel arm 23 is again disposed in proper position for the reception of the next palette 11.

After the swinging movement of the lower swivel arm 21 has been carried out, the palette 11 disposed on it actuates the valve $P_7$, which at the same time actuates the pneumatic slide valves $J_3$ and $J_2$. The pneumatic slide valve $J_3$ actuates the pneumatic cylinder $Z_8$ which slides the palette 11 from the lower swivel arm 21 onto an empty rail 14 of the chain magazine 10 aligned with the arm 21 at that time. The pneumatic slide valve $J_2$ brings about an actuation of the pneumatic cylinder $Z_2$ whose piston thereby is moved into a retracted position in which it is ready for pushing the next following palette 11 onto the swivel arm 23.

After the palette 11 has been pushed completely onto the rail 14 of the chain magazine 10, it actuates the valve $P_8$ which, then actuates the pneumatic slide valve $J_3$ through which the piston of pneumatic cylinder $Z_8$ is moved back into the starting position, and is ready for the pushing of the next palette 11 onto a rail 14. When the valve $P_8$ is actuated the magnet valve $S_1$, which possesses a pneumatic servo valve is simultaneously actuated through the opened locking valve $P_9$, thus starting the cycle for the next palette 11.

When the first palette 11 filled with processed work-pieces 4 reaches the uppermost point B of the upper portion of the chain magazine 10 going from right to left (FIG. 1), then there remain disposed on the chain magazine 10 only palettes 11 with processed work-pieces 4. In order to automatically shut off the device when this condition is reached, a blank palette 34 (FIGS. 10, 10a) can be placed on the lowermost rail 14 at point C when loading the chain magazine 10. The blank palette 34 contains neither receiving holes N for the work-pieces 4 nor grooves M, but is provided with a projection U, which when the blank palette 34 reaches the position B, i.e. the palette position immediately prior to D on the chain magazine 10, actuates the locking valve $P_9$. When the projection U actuates and locks the locking valve $P_9$ it interrupts the connection between the valve $P_8$ and the magnet valve $S_1$. The chain magazine 10 accordingly no longer can carry out further cycle steps $T_1$.

Since the cycle device 12 for processing palettes 11 through the loading and unloading station L of the work-piece loading device is arranged on the work-piece carriage 2 of the processing machine, the corresponding palette 11, for the work-piece 4 clamped between the centering tips 5 and 6 follows each movement of the work-piece carriage 2. The palette 11 is shifted back and forth on the guide rail 9 corresponding to the movements of the work-piece carriage 2 by the cycle device 12 arranged on the work-piece carriage 2. As a result the loading and unloading station L always conforms to the position of the work-piece loading device (not shown), arranged on the work-piece carriage 2, and the position of the centering tips 5 and 6.

It will be understood that the control of the device according to the invention may also be carried out by electrical or hydraulic means or by a combination of electrical, hydraulic and pneumatic means.

The utilization of a control which is pneumatic for the most part is less expensive, as it requires no electrical control elements or relatively few of the same. In addition, it may be attached to the general compressed air network and also requires no special return conduits, since the compressed air may be discharged into the atmosphere.

What is claimed is:

1. Apparatus for the feed and removal of palettes provided with work-pieces to a loading and unloading device for a machine tool in which a work-piece is removed from the palette for processing and after processing is returned to its original position in the palette, said apparatus comprising:

a feed mechanism including a continuous chain conveyor;

longitudinally extending rail members connected to said chain conveyor and disposed transversely to the path of movement of said chain conveyor for carrying longitudinally extending work-piece palettes thereon, said rail members being disposed parallel to each other with uniform spacing therebetween, each of said rail members being adapted to carry one palette thereon;

means for advancing said chain conveyor in predetermined steps a distance corresponding to the spacing between said rail members;

a guide rail for receiving and moving a palette to and from a loading and unloading device, said guide rail including means thereon for cooperating with a palette for guiding the palette in a predetermined path of movement;

automatically actuatable means for guiding a palette from said feed mechanism to the loading and unloading device; and automatically actuatable means for returning a pallet from said guide rail to said feed mechanism.

2. The apparatus of claim 1 wherein
said guide rail is inclined to the horizontal to allow a palette positioned thereon to be moved to and from a loading and unloading station by a gravity drop.

3. The apparatus of claim 2 including
swingable carrier means interposed between said feed mechanism and said guide rail for feeding a palette to said guide rail and for returning a palette from said guide rail to said feed machanism.

4. The apparatus of claim 3 including
means for actuating said swingable carrier means, said last named means being actuatable by a palette.

5. The apparatus of claim 1 including
swingable carrier means interposed between said feed mechanism and said guide rail for transferring a palette from the former to the latter.

6. The apparatus of claim 1 including
swingable carrier means interposed between said guide rail and said feed mechanism for transferring a palette from the former to the latter.

7. The apparatus of claim 1 including at least one palette having formed on its underside means defining a groove for receiving therein one of said rail members or said guide rail.

8. The apparatus of claim 1 including
a plurality of palettes each of said palettes having formed on its underside means defining a groove for receiving therein one of said rail members or said guide rail; and
a cycling device operatively associated with said guide rail for positioning a palette in a predetermined position with respect to a loading and unloading device adapted to be associated with the machine tool.

9. The apparatus of claim 8 wherein
each of said palettes has formed on its sides recesses spaced at predetermined intervals for cooperating with said cycling device for positioning said palette in a predetermined position with respect to the loading and unloading device.

10. The apparatus of claim 9 including
means defining work-piece receiving holes formed in each of said palettes and disposed at predetermined intervals corresponding to the spacing of said recesses formed on the sides of said palette.

* * * * *